United States Patent [19]

Kobayashi

[11] Patent Number: 4,622,134
[45] Date of Patent: Nov. 11, 1986

[54] APPARATUS FOR TREATING SEWAGE

[76] Inventor: Hidenori Kobayashi, 4-383, Tokoji-cho, Kofu-shi, Yamanashi-ken, Japan

[21] Appl. No.: 664,272

[22] Filed: Oct. 24, 1984

[30] Foreign Application Priority Data

Oct. 25, 1983 [JP] Japan .................. 58-199665
Oct. 25, 1983 [JP] Japan .................. 58-199666

[51] Int. Cl.⁴ .............................. C02F 3/20
[52] U.S. Cl. ......................... 210/127; 210/129; 210/139; 210/195.3; 210/220
[58] Field of Search ............. 210/614, 139, 101, 102, 210/109, 104, 105, 127, 129, 142, 195.3, 200-202, 205, 220

[56] References Cited

U.S. PATENT DOCUMENTS

| 3,342,727 | 9/1967 | Bringle | 210/614 |
| 3,524,547 | 8/1970 | Nicol | 210/139 X |
| 3,721,344 | 3/1973 | Rost | 210/139 X |
| 3,879,290 | 4/1975 | Arnot, Jr. | 210/139 X |
| 4,179,366 | 12/1979 | Kaelin | 210/614 |
| 4,333,838 | 6/1982 | Ballnus | 210/614 |

Primary Examiner—Tom Wyse
Attorney, Agent, or Firm—Sughrue, Mion, Zinn, Macpeak, and Seas

[57] ABSTRACT

An apparatus for treating sewage is disclosed wherein incoming sewage is in turn put into a balancing tank, an aeration tank and a precipitation tank, settled sludge in the precipitation tank being returned to the aeration tank, which aerates the sewage in adjusted relation with its flow rate, but permits intermittent aeration in the absence of sewage flowing into the aeration tank and prolonged aeration after termination of sewage flow into the tank.

5 Claims, 14 Drawing Figures

FIG. 10
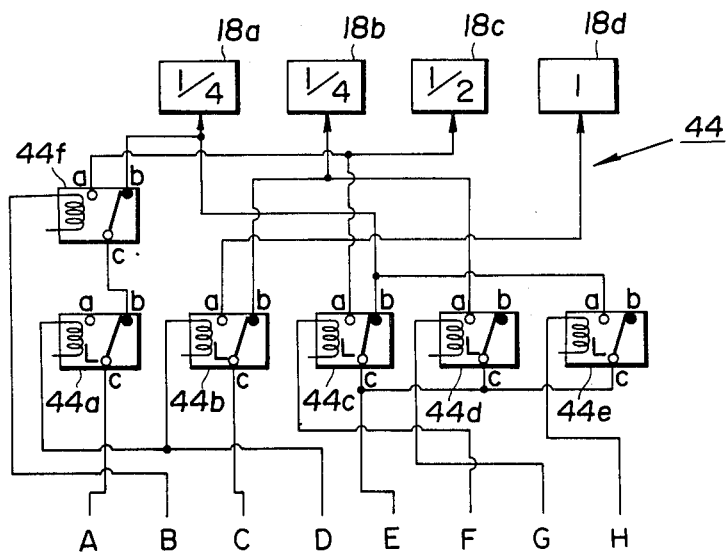
FIG. 9
FIG. 11
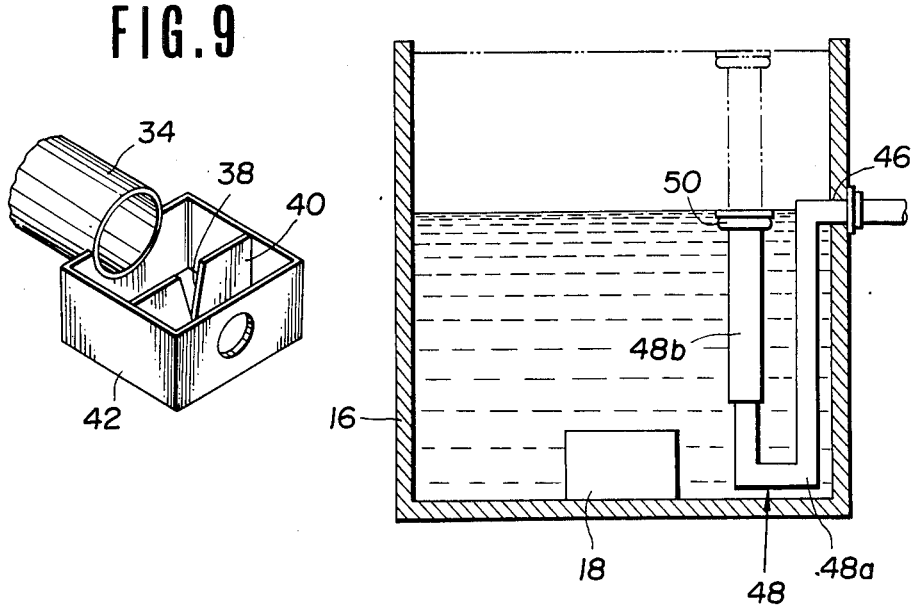

4,622,134

APPARATUS FOR TREATING SEWAGE

BACKGROUND OF THE INVENTION

This invention relates to the treatment for sewage and more particularly to an apparatus for treating sewage through the action of aerobic bacteria or related organisms.

DESCRIPTION OF THE PRIOR ART

Sewage is a combination of some types of liquid wastes reaching sewers after use and includes waste waters conducted away from residences, business buildings, institutions and the like. These waste waters are broadly classified as sanitary or domestic wastes and industrial wastes.

Generally, sewage may be bacteriologically treated in an aerobic environment. Such a mode of sewage treatment requires a sufficient amount of oxygen for the bacteria to stimulate their growth and to increase the rate of oxidation, thus decomposing the organic matter. To this end, there have heretofore been proposed an activated sludge process, a contact aeration process and similar processes, all of which depend on bacterial activity.

In accordance with the activated sludge process, incoming sanitary sewage is transferred from a sewage source to a screen and then to a sand pond where impurities of relatively large particle size and specific gravity present in and sewage are removed, and is further transferred in a balancing tank for a temporary storage. Or, sewage is directly sent to an aeration tank. The primary effluent is then sent to the aeration tank by a pump where effluent is aerated by a blower so as to bring into contact with aerobically living bacteria for absorptive oxidation and activation. The effluent is thereafter transferred to a precipitation tank where sludge included in the effluent is settled and separated, the sludge being partly or wholly returned to the aeration tank. The resulting supernatant liquid is subjected to disinfection and is finally disposed through drainage channels.

In the conventional process, however, a good-quality or clean effluent can not normally be obtained even when it operates at the maximum efficiency. Because, final plans and profiles or sewers are determined with extensive attention to major factors such as geographical requirements, population increases, quantitative and flow patterns of sewage or the like. Nevertheless, the sewer plants thus completed are often unlikely to work as planned. This is particularly true of sanitary sewage resulting from establishments such as public halls, gymnasia, stores, stations and like sources, since the sewage flow rate from these sources varies largely on an hourly, daily or seasonal basis.

In order to carry into practice, the conventional sewer of the activated sludge process which is equipped with a plurality of pumping and blowing facilities, all the pump and blowers are continuously operated when incoming sewage is abundant or overloaded. Even when a small or no flow of sewage takes place, i.e., underloaded, the number of running pumps and blowers is minimized. Thus, at least one blower is made to run to effect aeration in the conventional system even in the absence of sewage flow. Such an aeration is liable to reduce the pH level of sewage in the aeration tank with passage of time and under the condition, organic matter present in the sewage becomes feeble or strongly acidic due to insufficient nutrition or oxygen consumption, resulting in killed aerobic bacteria. Needless to say, the bacterial death in the sewage does not allow any clear effluent to be produced and drained. To be more specific, the balance is readily destroyed between bacterial activity and nutrient supply, which would ultimately render the organic matter undecomposable and would adversely affect the rate of aeration and hence purification.

Apart from the above, sewage is usually brought into contact with aerobic bacteria in the aeration tank, the contact time being referred to as a residence time. When taking no count of the sludge return to the aeration tank, the residence time is defined as an average hourly flow of sewage ($m^3$/hour) divided by the volume of the aeration tank ($m^3$). The average residence time is of critical importance for sewage treatment. In the existing activated sludge process, the residence time can not be satisfactorily controlled, particularly when the balancing tank is not used. Because, when sewage comes originally from the establishment referred to the above, its flow may be occasionally variable with a sudden increase. Overflowed sewage can not but be discharged quickly from the aeration tank, thus making it impossible to maintain the average residence time to a desired extent. Even when a plurality of blowers are operated in full, the sewage which being insufficiently aerated is transferred to a subsequent stage of treatment, producing poor-quality effluents.

SUMMARY OF THE INVENTION

It is therefore a primary object of the invention to provide a method of and an apparatus for treating sewage which are free of the foregoing drawbacks of the prior art technique and which effects optimum aeration by actuating blowers in cooperative relation with pumps even when actual sewage flow amount is extremely greater or smaller than a planned flow amount, thereby discharging good-quality effluent.

Another object of the invention is to provide a method of and an apparatus for treating sewage which can economically effect aeration in adjusted relation with sewage flow amount, causing blowers and pumps to work nothing less than required in that sewage flow condition, thereby saving energy.

A still another object of the invention is to provide a method of and an apparatus for treating sewage which controls sewage flow from an aeration tank to a next stage so as to obtain a sufficient residence time for effecting complete aeration, thereby discharging good-quality effluents.

According to a first aspect of the invention, there is provided a method of treating sewage, comprising: initiating aeration upon sewage flowing into the aeration tank, effecting aeration to the sewage in adjusted relation with its flow rate, prolonging aeration for a predetermined time length after termination of the sewage flow into the tank and causing intermittent aeration in the absence of sewage flow when continued for a predetermined period. Thus, the sewage, when flows into the aeration tank, is completely aerated to an extent that the sewage becomes an activated sludge to maximize purification.

According to a second aspect of the invention, there is provided an apparatus for treating sewage, which comprises, an aeration tank arranged for receiving the sewage and having at least one blower provided for blowing air into the sewage, a precipitation tank located for receiving sewage aerated at and conveyed from the aeration tank and for settling and separating sludge present in the sewage, the sludge being partly or wholly returned to the aeration tank and timing means for controlling the blowers in such a manner that said blower operation is prolonged for a predetermined time length after termination of sewage flow, and that said blower operation is intermittently effected in the absence of the sewage flow when continued for a predetermined time length.

BRIEF DESCRIPTION OF THE DRAWINGS

These and other objects and advantages of the invention will be more apparent from the following description and drawings, in which:

FIG. 9 is a perspective view of another modified form of the conduit shown in FIG. 7;

FIG. 10 is a circuit diagram for the blower operation shown in FIG. 7;

FIG. 11 is an explanatory view of a discharge pipe provided in an aeration tank;

DETAILED DESCRIPTION OF THE PREFERRED EMBODIMENTS

Figure 1:
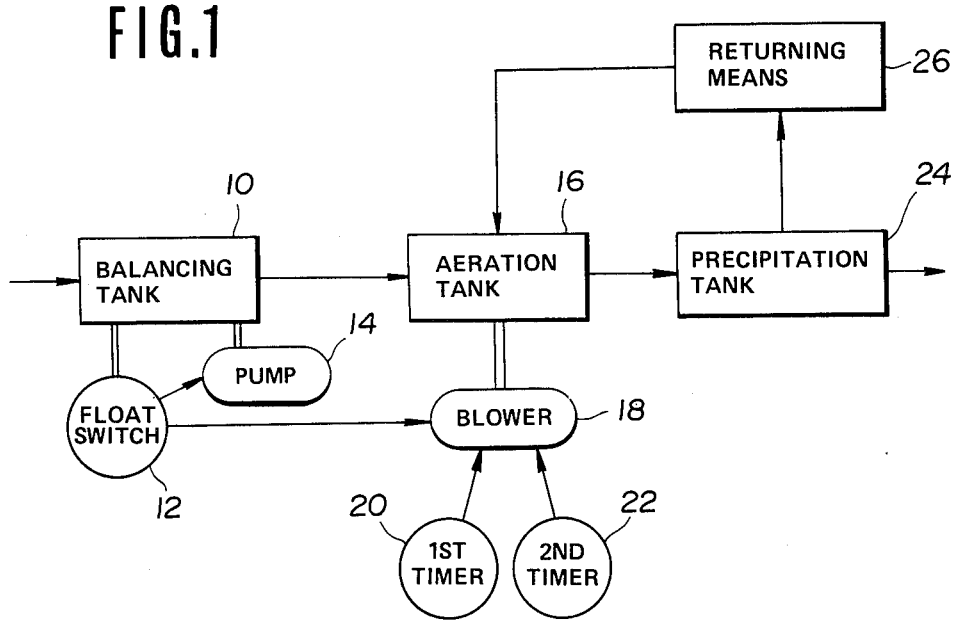
FIG. 1 is a block diagram showing the sequence steps embodying a method of the invention.
Figure 3:
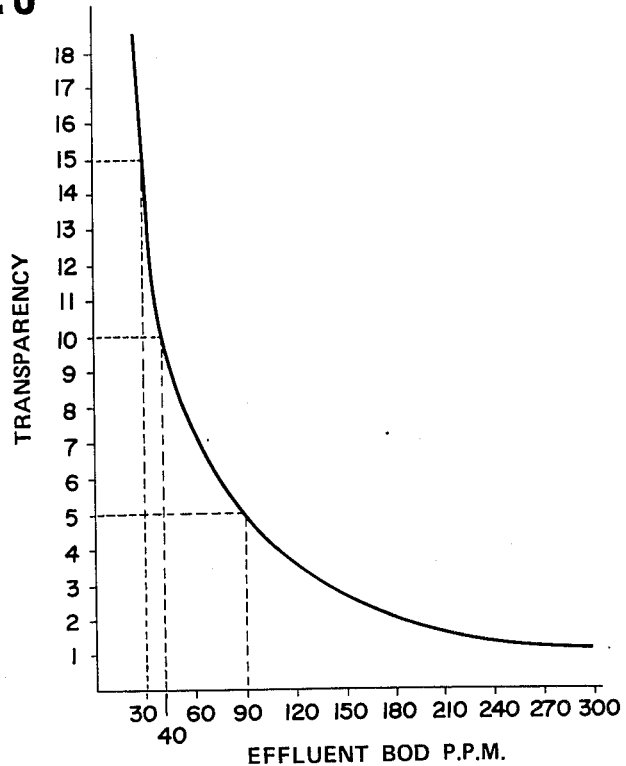
FIG. 3 is a graph showing a general relationship between the transparency and BOD contents of effluent.
Figure 2:
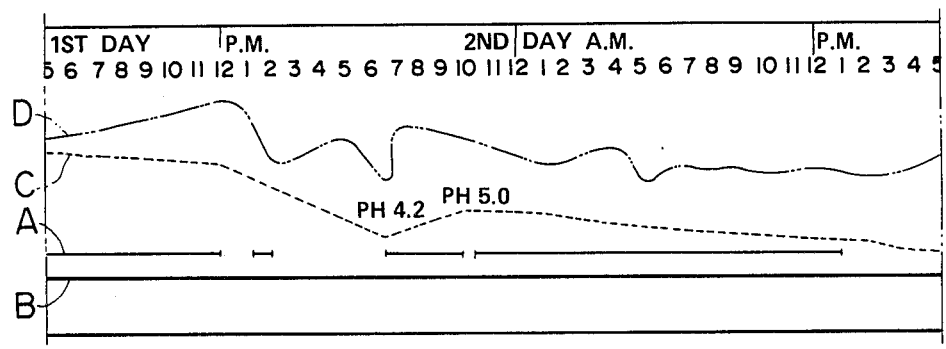
FIG. 2 is a graph showing field test results of the method shown in FIG. 1.
Figure 2:
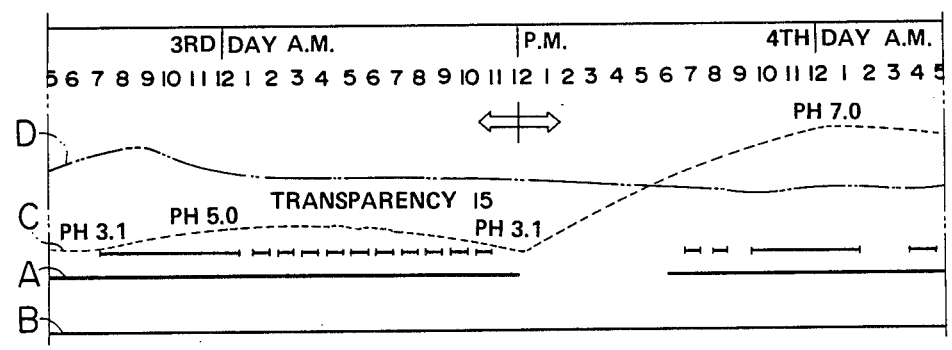
Figure 2:
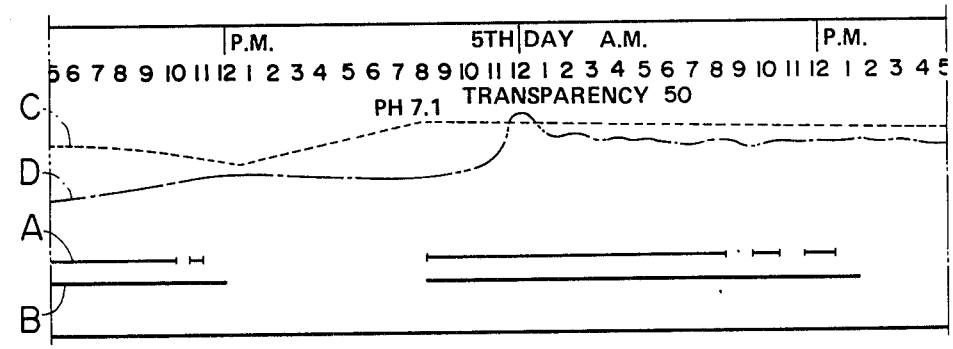

Referring now to FIGS. 1 to 3, a sewage treatment method of this invention will be described for illustrative purposes.

As better shown in FIG. 1, sanitary sewage resulting from premises such as schools and the like is transferred to a screen (not shown) and then to a sand pond (not shown) where impurities of large particle size and specific gravity present in the sewage are removed and separated. The sewage thus treated is once stored in a balancing tank 10. As the sewage level is increased in the balancing tank 10, a float switch 12 is switched on so that a pump 14 is operated to draw the sewage into an aeration tank 16 directly or through a weigher (not shown). A blower 18 located in the aeration tank 16 is operatively connected with the pump 14 which in turn is actuated by the float switch 12. That is, aeration commences upon flowing of the sewage into the aeration tank 16 by the pump 14 and terminates upon stopping of the pump 14 when the balancing tank 10 is empties. The blower operation caused by the float switch 12 is a main blower operation which is intended to completely aerate sewage flowing within an usual flow time zone.

Additionally, the blower 18 is so structured as to be operable either by a first timer 20 or a second timer 22, also. The function of the first timer 20 is to prolongably operate the blower 18 for a predetermined time length after the pump 14 is stopped. The prolonged operation of the blower 18 is intended to maintain sewage in the aeration tank 16 at an optimum BOD load and to continue decomposing organic matter present in the sewage and to eventually obtain maximum efficiency of sludge settlement and separation. Incoming sewage can therefore be completely aerated when flowing into the tank even just before the pump 14 stops. The time required for the prolonged blower operation depends largely on the loads of BOD. Preferably, the time is about 30 minutes.

The second timer 22 is disposed to intermittently operates the blower 18 for a given length of time in the case that the pump 14 works for only a limited time in a day when no or small amount of sewage flows into the aeration tank 16, and also in the case that the pump 14 remains inoperated for several consecutive days or months. The intermittent operation caused by the second timer 22 is intended to supply the minimum quantity of air to the sewage for preventing activated sludge in the sewage from becoming feeble due to the lackness of air. The sewage once stored in the aeration tank 16 is thus prevented from putrefaction and prepared for entry of new flow of sewage. The intermittent operation of the blower 18 may be done optionally depending on the temperature of the sewage in the aeration tank 16 and temperature external to the tank. It is however desired that operation period and frequency are set to be 4 times per a day, each time being about 15 minutes.

Activated sludge thus aerated in the aeration tank 16 is transferred to a precipitation tank 24 where the sludge is settled and separated. Part or whole of the sludge is returned to the aeration tank 16 through a returning means 26. Thereafter, the resulting supernatant liquid is disinfected and drained.

Preferably, the aeration tank 16 is provided with a filter member, used in the contact aeration process, to which aerobically active bacteria are attached.

The method of the invention permits to aerate sewage for a prolonged period just after sewage flow has ceased, and to aerate sewage intermittently when its flow continues to be ceased for an extended period of time. Consequently, this method induces no overloaded aeration as is often the case experienced in the prior art technique and keeps activated sludge at a neutral pH level. In such environment, aerobic bacteria are the most active and thus facilitate oxidation of sewage, with the results that good-quality effluents are normally obtainable.

In order to determine the effectiveness of the method according to the invention, the following field test was conducted using one selected sewage disposal built for a housing development (Kita-Shimojo Development, Nirasaki-shi, Yamanashi-ken, Japan). Details of the sewage disposal are that; planned population, 224; drainage system, separate; treatment system, activated sludge and long-run aeration; planned sewage amount, 56 m³/day; sewage quality, BOD 200 ppm and SS 250 ppm; and planned treatment efficiency, effluent of BOD 30 ppm.

The test period ranged for 5 days.

Sewage in an aeration tank was measured by suitable measuring means with respect to the variations in pH before and after application of the method of this invention, with the results given in FIG. 2. The variations expressed by lines A to D were all those occurring after the time the sewage present in the aeration tank had been adjusted in its neutral pH level (pH 7.0) at 5 a.m. of the 1st day.

Line A: pump operation in balancing tank
Line B: blower operation in aeration tank
Line C: pH change of sewage in aeration tank
Line D: pH change of newly incoming sewage The results before 12 a.m. of the 3rd day are directed to those obtained when the blower was continuously run for 24 hours without use of the method (arrow: left), whereas the results after the above hour and day indicate those obtained when the blower was operated cooperatively with the pump according to the method (arrow: right).

As is apparent from FIG. 2, the level of pH was decreased suddenly to 4.2 in the aeration tank over the time length between 12 a.m. of the 1st day when the pump was stopped and 6 a.m. of the 1st day when the pump was caused to run once again. Upon subsequent operation of the pump, the level rose gradually and reached its peak (pH 5.0) at 10 p.m. of the 1st day. Thereafter, such level of pH was again reduced slowly but to 3.1 with the passage of time between 1 p.m. of the 2nd day when the pump was ceased to run and 7 p.m. of the 2nd day when the pump was operated once again. Even after operation of the pump, the level showed only a slight rise to 5.0 and then falls to 3.1 at 12 a.m. of the 3rd day. At this stage, the blower was caused to operate in cooperation with the pump.

When the blower was ceased to operate between 12 a.m. and 6 p.m. of the 3rd day during which the pump was out of run, the level of pH rose suddenly in the aeration tank and continued to increase even after 6 p.m. of the 3rd day when the blower and pump were in cooperative operation. At 12 p.m. of the 3rd day such level reached its peak of 7.0 and then decreased gradually while the blower was being run, whereupon the level began to rise once again during stop of the blower, i.e. between 12 a.m. and 8 p.m. of the 4th day and was ultimately raised up to 7.1.

It has been confirmed from the illustrated results that when the blower is in continuous run for a whole day under the conditions of underloaded BOD of an extremely low content, the level of pH becomes strongly acidic in the aeration tank. While a temporary slight rise in pH may be possible by the section of the pump, nevertheless this level of pH is too acidic to attain aerobically bacterial oxidation. At and after 12 a.m. of the 3rd day, as shown in FIG. 2, stopping of the blower in cooperative relation with the pump serves to suddenly raise the pH level of the sewage in the aeration tank, irrespective of whether the pump is again caused to operate, as well as the pH level of incoming sewage. The sewage can thus be maintained at a substantially neutral, stable pH level in the aeration tank.

Moreover, of noteworthy importance is the transparency of effluents drained. An effluent coming out at 12 a.m. of the 3rd day was 15 in its transparency, whereas an effluent drained at 12 p.m. of the 4th day had a transparency of 50. As can be ascertained from FIG. 3, the higher BOD contents, the lower the transparency of effluents. For example, the transparency values of 10 and 15 are equal to 40 ppm and 30 ppm of BOD, respectively. By the transparency of 50 is meant a very high rate of efficiency of BOD removal, i.e., a drained effluent of a small BOD content. Consequently, the method of this invention is surprisingly effective in obtaining high-quality or clean effluents.

The effluent drained and collected from the above field test was inspected by a supervising municipal agency (Yamanashi Environmental Hygiene Inspection Center, Japan) as follows:

| Transparency | 50 |
| pH | 7.2 |
| BOD | 4.5 mg/l |
| COD | 6.2 mg/l |
| SS | 8.6 mg/l |
| Coliform groups | 0 |

The method of this invention was additionally tested in some establishments. The effluents collected from these tests were likewise inspected by the same agency as named above.

| (1) Yamanashi Medical University | |
|---|---|
| Transparency | 50 |
| pH | 7.6 |
| BOD | 9.0 mg/l |
| COD | 8.5 mg/l |
| SS | 12.5 mg/l |
| Coliform group | 0 |
| (2) Sanken Housing Development | |
| Transparency | 50 |
| pH | 6.6 |
| BOD | 5.0 mg/l |
| COD | 9.7 mg/l |
| SS | 16.4 mg/l |
| Coliform group | 0 |
| (3) Ichinomiyanishi Elementary School | |
| Transparency | 50 |
| pH | 7.8 |
| BOD | 2.2 mg/l |
| COD | 8.1 mg/l |
| SS | 6.2 mg/l |
| Coliform group | $82/m^3$ |
| (4) Nirasaki Municipal Grounds | |
| Transparency | 50 |
| pH | 7.23 |
| BOD | 5.7 mg/l |
| COD | 5.3 mg/l |
| SS | 3.8 mg/l |
| Coliform group | 0 |
| (5) Makigaoka Municipal Hospital | |
| Transparency | 38 |
| pH | 7.1 |
| BOD | 4.2 mg/l |
| COD | 7.3 mg/l |
| SS | 11.0 mg/l |
| Coliform group | 0 |

Figure 4:
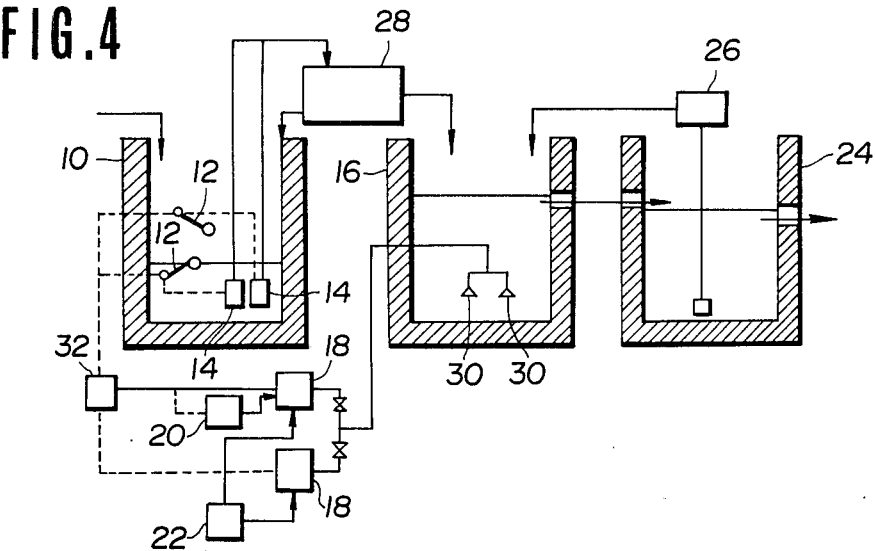
FIG. 4 is a diagrammatic explanatory view of an apparatus according to the invention.

FIG. 4 illustrates an apparatus for treating sewage in accordance with the invention, wherein like reference numerals denote like parts.

A balancing tank 10 has a plurality of pumps 14, 14 disposed therein. As can be seen from FIG. 4, two pumps 14, 14, a first pump being left and a second pump being right, are shown in the illustrated embodiment. The two pumps 14, 14 are each operated to pump sewage into a weigher 28 which serves to adjust the amounts of sewage flowing into an aeration tank 16. Alternatively, the pumps 14, 14 may be so configured as to achieve such flow adjustment without the need for the weigher 28. Located externally to the aeration tank 16 are plurality of blowers 18, 18 for blowing air into the tank 16 through outlets 30, 30 disposed therein and connected to the blowers. Such air blowing is intended to supply a sufficient volume of oxygen to activated sludge so as to facilitate the propagation and activation of aerobic bacteria living in the sludge. Altough a single aeration tank is exemplified herein for brevity, a pair of aeration tanks may be cooperatively connected in that each tank receives air from the blowers 18, 18. The aeration tank 16 may be either of the types wherein activated sludge is allowed to float on the sewage level and wherein a filter is provided for attaching aerobic bacteria thereto as is used in the contact aeration process.

The sewage sufficiently aerated in the aeration tank 16 is then conveyed from an upper part thereof to a precipitation tank 24 where sludge is settled and separated. The resulting supernatant liquid is post-treated if desired and thereafter drained. The sludge thus settled is partly or wholly returned by suitable returning means 26 to the aeration tank 16, connected between the tank 16 and the tank 24. Preferably, such sludge return is performed not only in activated sludge-floating aeration but also in contact aeration.

Designated at 12, 12 are a pair of float switches positioned in the balancing tank 10 for actuating the pump 14, 14. One of the float switches lies at a predetermined standard level in the tank 10 and, as the sewage reaches the level, is switched on to actuate one pump. The other float switch 12 lies at a higher position, i.e., at an emergency sewage level, in the tank and as the sewage reaches the emergency level, is switched on to actuate the second pump 14. Thus, both the first and second pumps 14, 14 come into operation under the emergency conditions. When the sewage is lowered to the standard level, the second pump 14 is caused to stop. Continued lowering of the sewage level below the standard level causes the first pump 14 to stop.

In order to actuate the blowers 18, 18, the float switches 12, 12 are connected to a selector 32. When the lower switch 12 is switched on, one blower is caused to operate. When both the lower and higher switches 12, 12 are switched on, both blowers 18, 18 operate simultaneously.

Designated at 20 is a first timer which, upon switching-off the float switches 12, 12, is switched on to keep the blowers 18, 18 in operation for an extended period of time even after the pumps 14, 14 are stopped. Since the float switches 12, 12 when switched off, cause to stop the two pumps 14, 14 and the blowers 18, 18 at the same time, newly incoming sewage which has come into aeration tank immediately before stopping of the pumps will remain un-aerated. It is essential therefore that the first timer 20 is provided to prolong operation of the blowers beyond a certain period and to eliminate the above noted inconvenience. For this prolonged operation, a sufficient time range is usually between about 30 minutes to about 1 hour, but varies with sewage amounts of flow into the aeration tank and BOD loadings.

Shown at 22 is a second timer which has a relay therein (not shown) and actuates the blowers 18, 18 independently of the float switches 12, 12. The second timer functions to intermittently actuate either one or both of the blowers 18, 18 for a given period, or to continuously actuate only either one blower for 24 hours. In a limited flow of sewage into the aeration tank 16, if the pumps 14, 14 are not caused to run, the blowers 18, 18 are out of operation since these blowers are cooperatively connected to the pumps 14, 14 as described hereinbefore. For instance, where no sewage should flow for a whole day, the blowers would never be operated for that day so that activated sludge might be likely putrefied due to insufficient oxygen. To this end, the blowers 18, 18 should necessarily be run, independently of the pumps 14, 14 for several times per a day, each time being for a predetermined period. On the other hand, in an increased amount of sewage flow or of a BOD loading wherein aerobic bacteria living in activated sludge would be required to stimulate for their growth, one of the blowers 18, 18 should be in continuous run.

Figure 5:
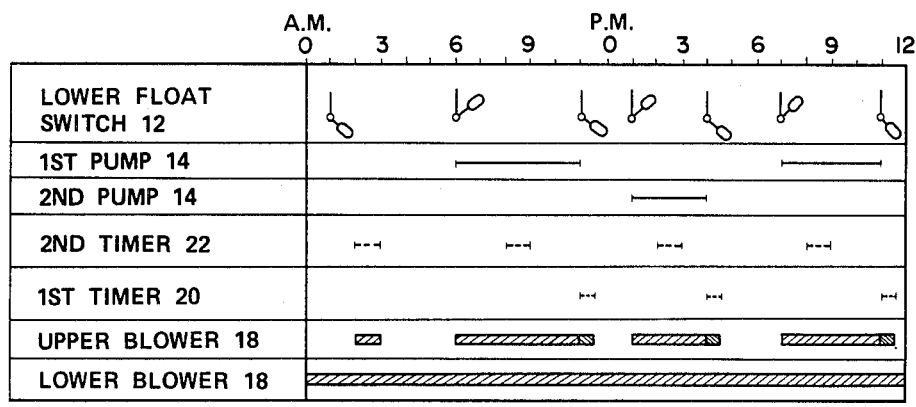
FIG. 5 is a chart showing an example how to actuate pumps and blowers used in the apparatus.

The following exmple is provided to illustrate the apparatus shown in FIG. 4 as utilized to treat sewage conducted away from a beast bone and fish tailing-treating plant, reference being made to FIG. 5. In this example both the pumps and the blowers were set to operate as follows:

(1) The first and second pumps 14, 14 were actuated alternatively by the lower float switch 12.

(2) The upper blower 18 was actuated together with either one of the pumps 14, 14 by the float switch 12 and operated for 4 times per a day, each time being for 1 hour, by the second timer 22. Subsequently, after termination of the pump 14, the upper blower 18 was continued to operate for another 1 hour by means of the first timer 20.

(3) The lower blower 18 was continuously run for 24 hours by the second timer 22.

At 2 a.m. to 3 a.m. of a day, the second timer 22 was swtiched on to actuate the upper blower 18 during which the blower was in simultaneous operation with the lower blower 18. Sewage was flowed at three intervals of 6 a.m. to 11 a.m., 1 p.m. to 4 p.m. and 7 p.m. to 11 p.m. at which intevals both blowers 18, 18 were also kept operative simultaneously. At 11 a.m., 4 p.m. and 11 p.m. when the sewage flow was discontinued and when the float switch 12 was switched off, the first timer 20 was switched on to prolong operation of the upper blower 18 for 1 hour.

Because sewage conveyed into the aeration tank 16 was of a high BOD content in this example, the lower blower 18 was continuously actuated, even in the absence of the sewage flow, to supply activated sludge with sufficient oxygen.

Immediately after new flow of sewage occurred by one of the pumps 14, 14 the upper blower 18 was also actuated together with the lower blower 18 already in operation to thereby ensure maintained balance between bacterial growth and nutrition supply (organic matter) in the aeration tank 16. Accordingly, a high rate of purification could be reliably obtained without inducing objectionable undecomposition and swelling of activated sludge.

Another advantage was that when new sewage flow took place, the upper and lower blower 18, 18 were put into simultaneous operation, with the results that the sewage was kept substantially stable at a pH of about 7 in which aerobic bacteria were so active as to enhance sludge precipitation.

Figure 6:
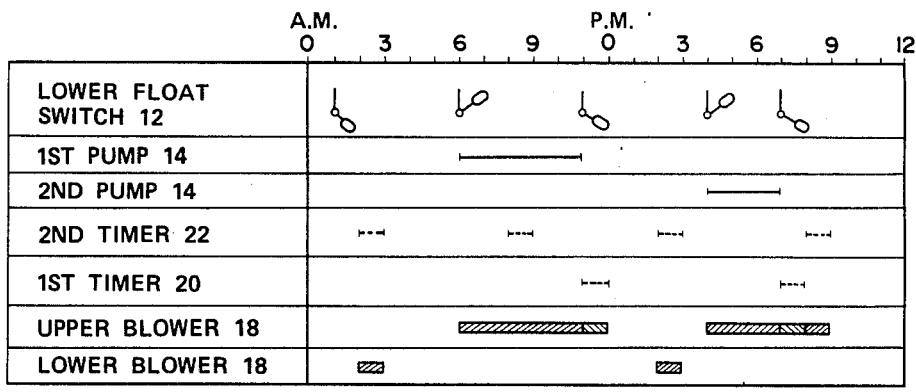
FIG. 6 is a chart similar to FIG. 5, but showing another example under underloaded sewage flow condition.

The following example is provided to further illustrate the apparatus shown in FIG. 4 as utilized to treat sewage coming from residential premises such as housing developments, hotels and similar sources wherein incoming sewage is totally absent or in quite small amount on an hourly basis, reference being made to FIG. 6.

In the additional example, both the pumps and the blowers were set to operate as follows:

(1) The first and second pumps 14, 14 were actuated alternatively by the lower float switch 12.

(2) The upper blower 18 was actuated together with the pumps 14, 14 by the float switch 12.

(3) The blowers 18, 18 were alternatively operated for 4 times per a day by the second timer 22. After the pumps 14, 14 were stopped, the upper blower 18 were prolonged in its operation for 1 hour by means of the first timer 20.

At 2 a.m. to 3 a.m. of a day, the lower blower 18 was operated to thereby initiate aeration. The float switch 12 was switched on, at two intervals of 6 a.m. to 11 a.m. and 4 p.m. to 7 p.m. when incoming sewage reached the standard level, to alternatively actuate the first and second pumps 14, 14. The sewage was then sent to the aeration tank 16, and at the same time, the upper blower 18 was initiated to run. Upon stopping of the pumps 14, 14 the upper blowers 18 was continued to operate by the first timer 20 for a further 1 hour and then stopped. Since the float switch 12, the timer 20 and the timer 22 were in turn energized between 4 p.m. and 9 p.m., the upper blower 18 was in continuous run for this period.

This example was particularly in the case of small amount sewage flow. Aeration was initiated in the aeration tank 16 only in the event that the float switch 12 was energized to actuate the first pump 14 and that sewage was conveyed into the tank 16, so that overloaded aeration was prevented. On the other hand, in the absence of sewage flow for a substantial passage of time, the second timer 22 was switched on to intermittently operates the blower 18 and to repeatedly carry out minimum aeration, with sludge kept against putrefaction. Even when the pumps 14, 14 were stopped, the upper blower 18 operatively connected to such pumps was prolonged in its time of run for a given period by the first timer 20. Sufficient aeration was therefore achieved with respect to new incoming sewage sent into the tank 16 just before the pump 14 was stopped.

According to one important advantage of the invention, aeration conditions may be optimumly selected to meet all actual factors including elevated amounts of sewage, large loadings of BOD, hourly, daily and seasonal variations in sewage flow and other parameters. Good-quality drainage effluents are therefore obtainable with utmost reliability.

Figure 7:
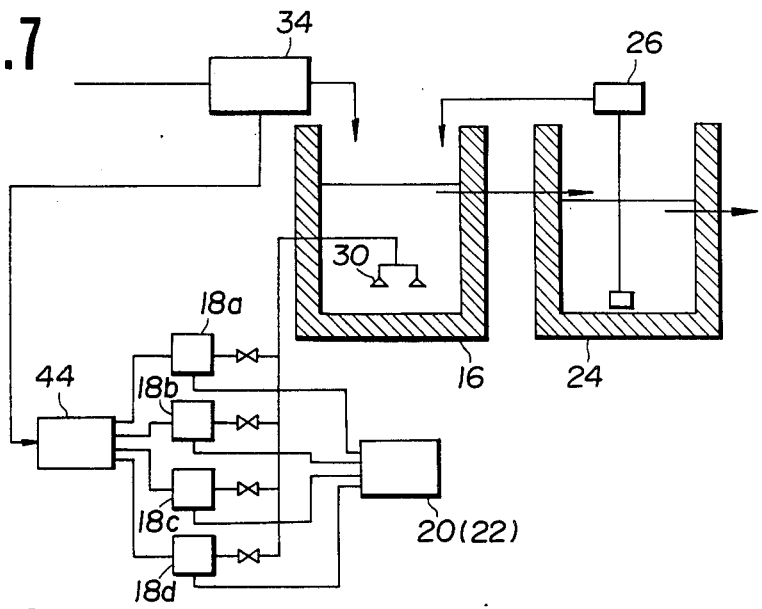
FIG. 7 is a diagrammatic explanatory view showing another arrangement of blowers in the apparatus shown in FIG. 4.

FIG. 7 shows another blower formation for the apparatus shown in FIG. 4, in which four blowers are used, wherein like reference numerals denote like parts.

As can be understood from FIG. 7, four blowers 18a to 18d are exemplified.

The blowers 18a to 18d are arranged in controlled relation with the incoming amounts of sewage from a sewage incoming conduit 34. For a variety of selectivity, the blowers 18a to 18d are preferably different in their respective outputs.

Figure 8:
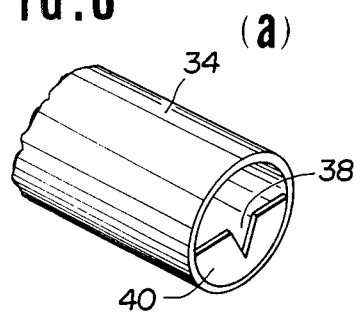
FIG. 8 is a perspective view of a conduit and sensors attached thereto shown in FIG. 7.
Figure 8:
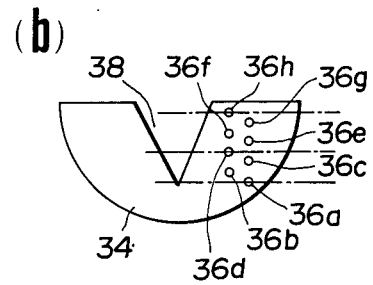

Designated at 36 is sensor means for detecting the amount of sewage flowing into the tank 16. The conduit 34 is provided with a stopper 49 at its discharge end which has a centrally recessed, triangular portion 38. The stopper 40 is provided at its inner surface, as shown in FIG. 8(b), with eight sensors 36a to 36h which are disposed in laterally spaced-apart relation with one another and which detect the amount of sewage passing through the recess 38. While eight sensors are exemplified, more or less sensors may be likewise acceptable. The sensors 36a to 36h are so arranged as to send their respective signal when sewage level reaches these sensors, whereby the sewage flow level is detected stepwisely. The number of stepwise detecting depends on daily treatment capacity, the number and volume of blowers 18, etc. Alternatively, the stopper 40 may be connected to a receiver 42, not to the conduit 34, for storage of the sewage coming from the conduit 34, as shown in FIG. 9. The triangular recess 38 of the stopper 40 may be in square or of any other shape.

Designated at 44 is a switch circuit for operatively controlling operation of four blowers 18a to 18d by the output of the sensor means 36. The circuit 44 varies in its structure with the number of sensors and blowers used. Reference numerals A to H are input terminals which are made "ON" upon receipt of the signals from their respective sensor, so that electric current flows to the blower 18 from a power source (not shown). The terminal A receives a signal of the lowermost sensor 36a, and the terminal B receives a signal of the next sensor 36b, and so on. The circuit 44 is composed of six relays 44a to 44f, each relay being closed at contact points c and b when its coils L is deenergized. The terminals A, C and E are connected to contact point c of the relays 44a, contact point c of the relay 44b and contact c of the relay 44c to 44e. The terminal D is connected to the coil L of the relays 44a and 44b whereas the terminals F, G, H, and B are connected to the coil L of the relays 44c to 44f. The blower 18a is connected to contact point b of the relay 44c, contact point b of the relay 44f and contact point a of the relay 44e, and the blower 18b is connected to contact point b of the relay 44b and contact point a of the relay 44d. Moreover, the blower 18c is in connection with contact point a of the relay 44c and contact point a of the relay 44f, while the blower 18d is in connection with contact point a of the relay 44b.

Again referring in FIG. 7, arranged are timer 20, 22 for actuating the blowers 18a to 18d independently of the switch circuit. The timers 20, 22 controls the prolonged blower operation after termination of the pump operation and intermittent blower operation in the absence of sewage flow, as described above.

The mode of operation of the circuit will be explained using FIG. 10.

If air blow output required is presumed to be "1" for a planned loading of sewage flow into the aeration tank 16, the blowers 18a to 18d are determined in their respective air outputs to be for example 18a, 18b="¼", 18c="½" and 18d="1".

(1) As the sewage amount of flow increases gradually in the incoming conduit 34, the sewage level comes into contact with the lowermost sensor 36a fixed to the stopper 40 at which time the sensor 36a sends a signal. The terminal A is made "ON", and electric current flows the relay 44a, the relay 44f and the blower 18a and hence the blower 18a is actuated. Thus, only the blower 18a with an air output of "¼" is in operation.

(2) As the sewage level reaches the next sensor 36b with the sewage flow amount is further increased, the sensor 36b sends a signal with which the terminal B is casued to be "ON". The coil L of the relay 44f is changed to close its contact points a and c to stop the blower 18a. However, since the terminal A is held "ON", the relay 44a and then the relay 44f are thus energized to thereby operate only the blower 18c with an air output of "½".

(3) Upon subsequent elevation of the sewage level, the sensor 36c switches on the terminal C to thereby energize the relay 44b and hence the blower 18b. The blower 18c is still being operated at this time, so that both the blower 18b and the blower 18c are thus in simultaneous operation, the blower output becomes "1.2"+"¼".

(4) Upon sensing of the sewage level, the sensor 36d turns on the terminal D to thereby change over the contact points of the relay 44a and the relay 44b. The relay 44a is cut off to stop the blower 18c. Electric current flows through the terminal C, the relay 44b and hence to the blower 18d. Operated at this stage is only the blower 18d with an air output of "1".

(5) Upon sensing of the sewage level, the sensor 36e turns on the terminal E. Electric current flows through the relay 44c and hence the blower 18a, whereby the blower 18a of a "¼" air output is initiated to run once again. The blower 18d of a "1" air output is still in operation at this time. Both the blower 18a and the blower 18d are therefore operated simultaneously.

(6) Upon sensing of the sewage level, the sensor 36 turns on the terminal F so that the coil L of the relay 44c is energized and changes over its contact points to stop the blower 18a. A connection between the terminal E, the relay 44c and the blower 18c is energized to run the blower 18c with an air output of "½". The blower 18d with an air output of "1" is still in operation at this time. Both the blower 18c and the blower 18d are therefore operated simultaneously.

(7) Upon sensing of the sewage level, the sensor 36 turns on the terminal G so that the coil L of the relay 44d is energized and changed over its contact points. A connection between the terminal E, the relay 44d and the blower 18b is energized to operate the blower 18b of a "¼" output. The blower 18c of a "½" output and the blower 18d of a "1" output are still in run at this stage of operation. The blower 18b therefore operates in simultaneous relation with the blowers 18c and 18d.

(8) Upon sensing of the sewage level, the sensor 36 turns on the terminal H so that the coil L of the relay 44e is energized and changed over its contact points. The blower 18a is initiated to run by energizing in turn the terminal E, the relay 44e and the blower 18a. the blower 18b, 18c and 18d are still being operated at this time. Thus, all the blowers 18a to 18d are in simltaneous operation with an air as twice a high as the planned loading.

The results obtained are tabulated in a Table as follows.

TABLE

| Sensor | 36a | 36b | 36c | 36d | 36e |
|---|---|---|---|---|---|
| Blower Air Output | 18a 1/4 | 18c 2/1 | 18b + 18c 3/4 | 18d 1 | 18a + 18d 11/4 |

| Sensor | 36f | 36g | 36h |
|---|---|---|---|
| Blower Air Output | 18c + 18d 11/2 | 18b + 18c + 18d 13/4 | 18a + 18b + 18c + 18d 2 |

As has been confirmed from the foregoing results, the air blow amounts can be eight stages by means of varying combination of the blowers 18a to 18d of different air outputs so as to meet the increased levels of sewage passing through the conduit 34, i.e., the amounts of sewage flowing into the tank 16. Aeration can therefore be effected with the amounts of sewage flow under optimum conditions. When sewage flow is reduced, the above procedures may be repeated in conversed manner to decrease the rate of air blowing.

The arrangement now under contemplation is shown as detecting the amounts of sewage flow at eight stages and meeting from an instance in which the flow of sewage is minimum or "¼" of the planned loading to an instance in which such sewage flow maximum or twice the planned loading by combining the four blowers 18a to 18d. The arrangement may be performed to satisfy all requirements changing parameters such as the number of sensors 42, the number and air rate of blowers 18, and the like.

If either one of the combined blowers 18a to 18d is caused to intermittently run by the timer 22, the flow rate of sewage is controlled with more accuracy. Such sewage flow rate may be more suitably controlled by computerized processing of various signals from the sensor 36, the switch circuit 44 and the timers 20, 22.

Figure 12:
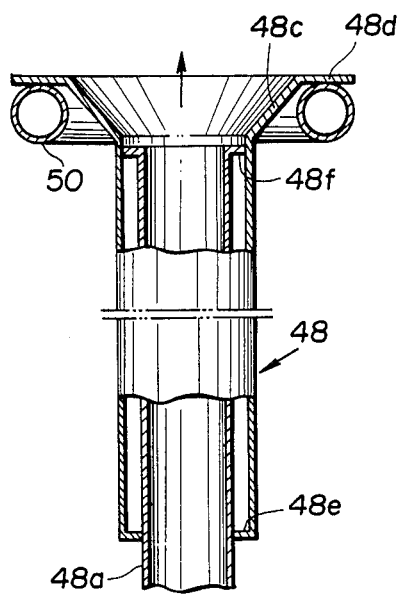
FIG. 12 is a, partly enlarged, cross-sectional view of the pipe shown in FIG. 11.
Figure 13:
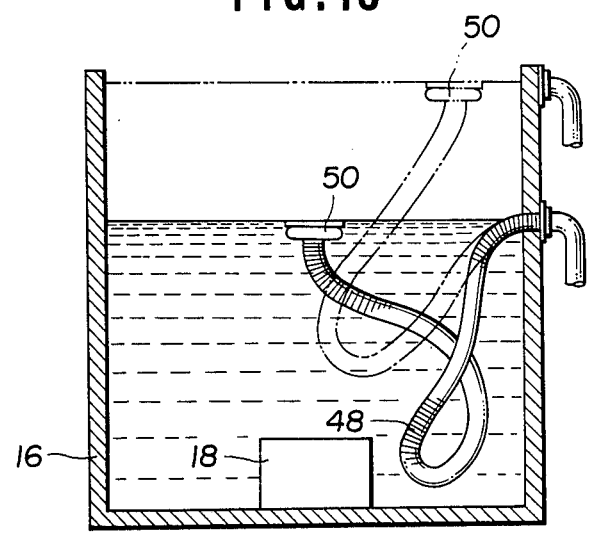
FIG. 13 is a view similar to FIG. 11, but showing another embodiment of the pipe.

FIGS. 11 to 13 show a control unit provided at the aeration tank, which controls flow rate of the aerated sewage to be sent to the precipitation tank.

Designated at 46 is a discharge opening positioned at the wall of the aeration tank 16 at a predetermined standard sewage level adapted to retain sewage in a limited volume such for example as of 10 $m^3$, as shown in FIG. 11. Disposed in the tank 16 is a discharge pipe 48 for discharging sewage out of the tank 16, as will be best seen from FIG. 12. The discharge pipe 48 includes a main pipe 48a, float pipe 48b adapted to engage with the main pipe 48a and having at one end a tapered intake 48c and a flanged portion 48d extending outwardly therefrom. A floater 50 is provided below the flange 48d in such a manner that the flange 48d is slightly below the sewage level so as to introduce sewage therein. The main pipe 48a is inserted through the tank wall opening 48 air-tightly and liquid-tightly.

The float pipe 48b has an inner diameter greater than the outer diameter of the main pipe 48a and hence receives the latter in telescopical manner. At the bottom end of the float pipe 48b is arranged in inwardly directed peripheral projection 48e which is engageable with a projection 48f of the main pipe 48a when the discharge pipe 48 is in fully extended condition, i.e., with the float pipe 48b lifted to the maximal critical point, upon temporary flow of excess sewage into the aeration tank 16, as shown by a phantom line in FIG. 11.

The discharge pipe 48 may be of flexible structure, as viewed in FIG. 13, with other component parts similar to those already described in connection with FIGS. 11 to 12. This particular conduit is thus floatable depending on the sewage level in the tank 16.

With the above-mentioned arrangement, incoming sewage is transferred to the aeration tank 16 from a sewage source directly or through a balancing tank. Upon flow of the sewage into the tank 16, the pipe 48 commences uplifting by the action of the floater, while the sewage is introduced in the pipe 48 through its intake 48c. The sewage continues to enter the tank 16 and then continues to enter the pipe 48. Since the pipe 48 is positioned at the predetermined sewage level at its discharge end, excess sewage beyond such level is overflowed into the precipitation tank 24 via the pipe 48. Therefore, the volume of sewage is held normally constant in the tank 16, the sewage can be retained in the tank 16 for a sufficient period of residence time for aeration.

When temporarily increased flow of sewage takes place on a daily, weekly or seasonal basis, the floater 50 causes the intake 48c to elevate. Consequently, the discharge rate of sewage out of the tank 16 is maintained to be substantially the same as in the normal case. The sewage is stored in the tank 16 for a sufficient time and is subjected to aeration treatment. But for the pipe 48, excess sewage beyond the predetermined level will flow out from a tank wall opening without being aerated sufficiently. However, with the arrangement of the float piper 48, excess sewage can be allowed to retain in the tank 16 for a sufficient time length and aerated sufficiently, without resulting effluent being adversely affected.

While there have been shown and described what are considered to be preferred embodiments of the invention for purpose of illustration only, it will be apparent to those versed in the art that various changes and modifications may be made thereto without departing from the spirit or scope of the invention as set out in the appended claims.

What is claimed is:

1. An apparatus for treating sewage, comprising:
   a balancing tank having a bottom side and a top side, said balancing tank for receiving sewage sent from a sewage source;
   a first float switch at a lower sewage level in the balancing tank;
   a second float switch at a higher sewage level in the balancing tank;
   a plurality of pumps in the balancing tank near the bottom side, one pump being connected to said first switch and the other pump being connected to said second switch for operation thereby;
   an aeration tank having a bottom side and a top side connected to and located downstream of the balancing tank for receiving sewage therefrom conveyed by said pumps;
   a plurality of interconnected blowers having conduit means to the interior of the aeration tank for supplying air to the sewage therein;
   said blowers having connection means to said switches for actuation thereby;
   a precipitation tank connected to and located downstream of the aeration tank for receiving aerated sewage sent from the aeration tank, said precipitation tank causing sludge present in the sewage to settle whereby resultant supernatant liquid in the sewage may be removed;
   means in the precipitation tank for returning settled sludge to the aeration tank;
   a first timer means connected to said first float switch and to one of said blowers and having means to continue operation of said blower to prolong operation thereof for a predetermined period after said first float switch is turned off; and
   a second timer means connected to said blowers independently of said switches and having means to periodically operate at least one of said blowers for predetermined periods of time in the absence of sewage flow into the aeration tank.

2. An apparatus according to claim 1; and
   an extensible discharge pipe in the aeration tank for controlling the overflow of the sewage in the tank.

3. An apparatus for treating sewage, comprising:
   an aeration tank for receiving sewage from a sewage source;
   conduit means connected to said aeration tank for conveying said sewage from the source to the aeration tank;
   stopper means in said conduit at its discharge end and a centrally recessed triangular opening therein for permitting flow of sewage therethrough;
   a plurality of vertically arranged sensor means on said stopper means to detect flow rate of the sewage transmitted in said conduit and passing through said opening;
   a plurality of interconnected blowers having conduit means to the interior of said aeration tank for supplying air to the sewage therein;
   said plurality of sensors and said plurality of blowers interconnected by electric switch curcuits and controlled thereby in such a manner that no blower is actuated when sewage flow rate is below a predetermiend minimum flow level while all of the blowers are actuated in succession as flow rate increases to a predetermined maximum flow level where all blowers are actuated;
   a precipitation tank connected to and located downstream of the aeration tank for receiving the aerated sewage sent from the aeration tank, said precipitation tank causing sludge present in the sewage to settle whereby supernatant liquid may be removed therefrom; and
   means associated with said precipitation tank and connected to said aeration tank for returning the sludge therein to the aeration tank.

4. An apparatus according to claim 3, wherein:
   said blowers having different output capacities from each other.

5. An apparatus according to claim 3; and
   timer means, associated with said blowers having means to prolong the blower operation for a predetermined period after the switch circuits have turned off and thereafter having the means to intermittently actuate one of the blowers for a predetermined period when the switch circuits have been kept off for a predetermined length of time.

* * * * *